Oct. 29, 1957     J. T. McNANEY     2,811,668
ELECTRON BEAM DEFLECTION CONTROL SYSTEM
Filed May 29, 1956     4 Sheets-Sheet 1
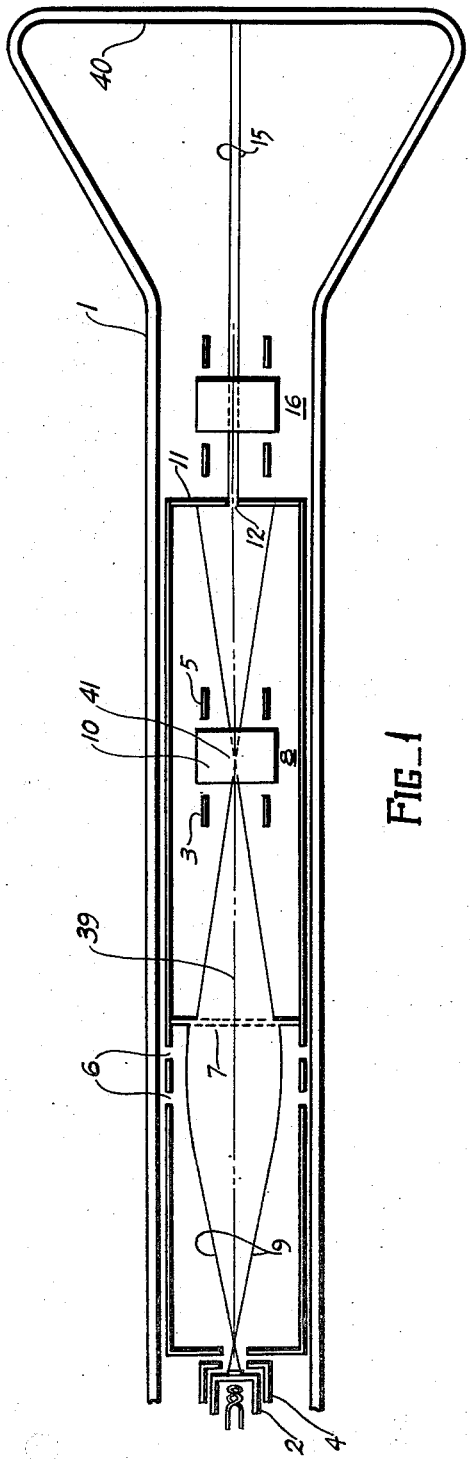
FIG_1
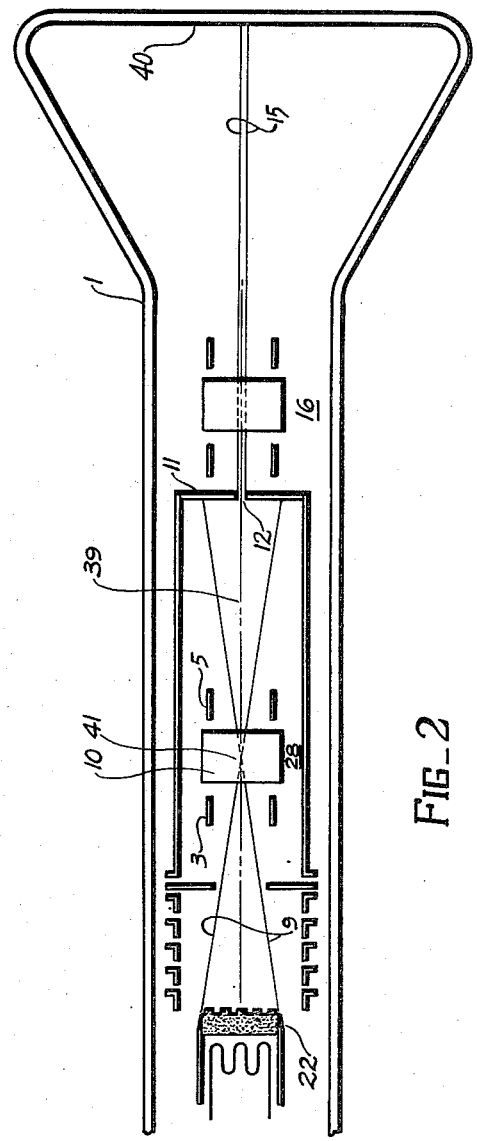
FIG_2
INVENTOR.
JOSEPH T. McNANEY.
BY *Egon W. Mueller*
ATTORNEY.

Oct. 29, 1957      J. T. McNANEY      2,811,668
ELECTRON BEAM DEFLECTION CONTROL SYSTEM
Filed May 29, 1956      4 Sheets-Sheet 2
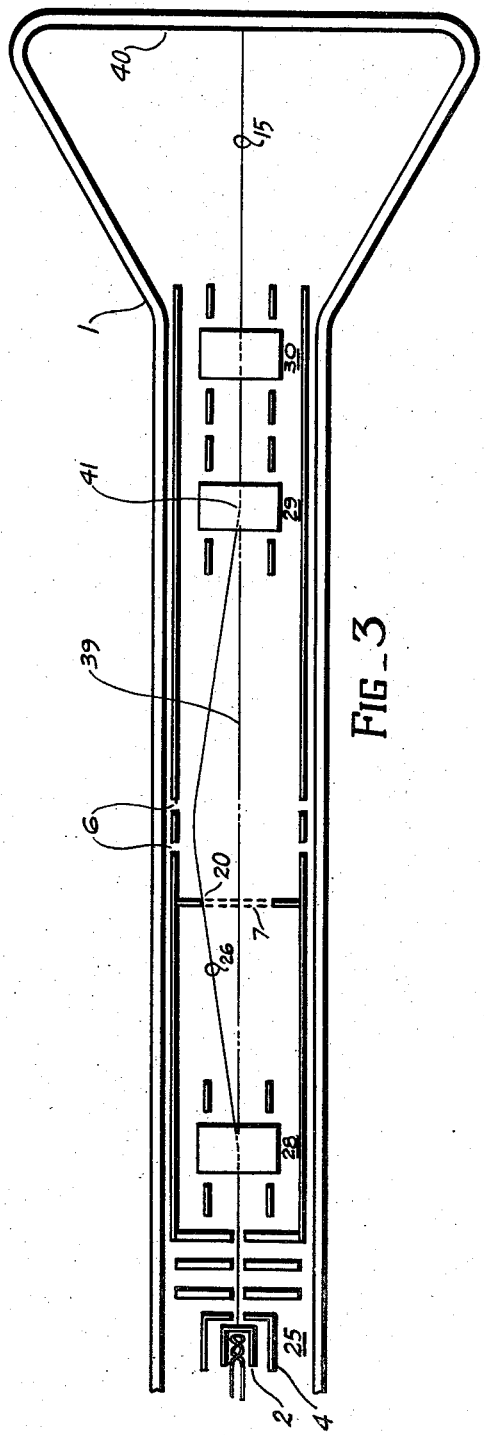
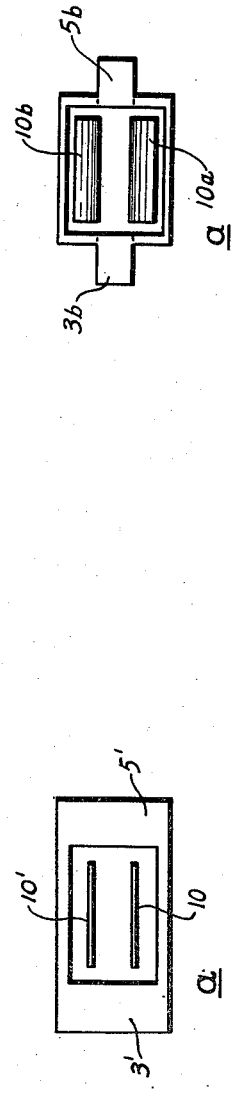
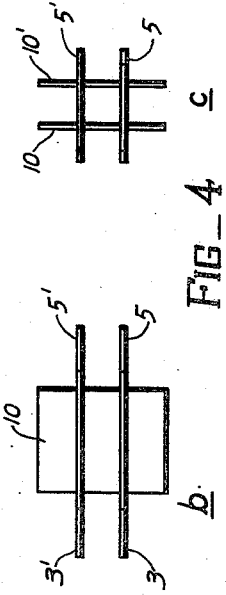
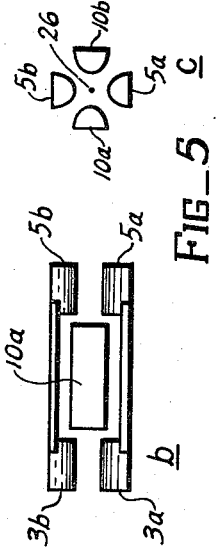
INVENTOR.
JOSEPH T. McNANEY.
BY
ATTORNEY.

Oct. 29, 1957  J. T. McNANEY  2,811,668
ELECTRON BEAM DEFLECTION CONTROL SYSTEM
Filed May 29, 1956  4 Sheets-Sheet 3
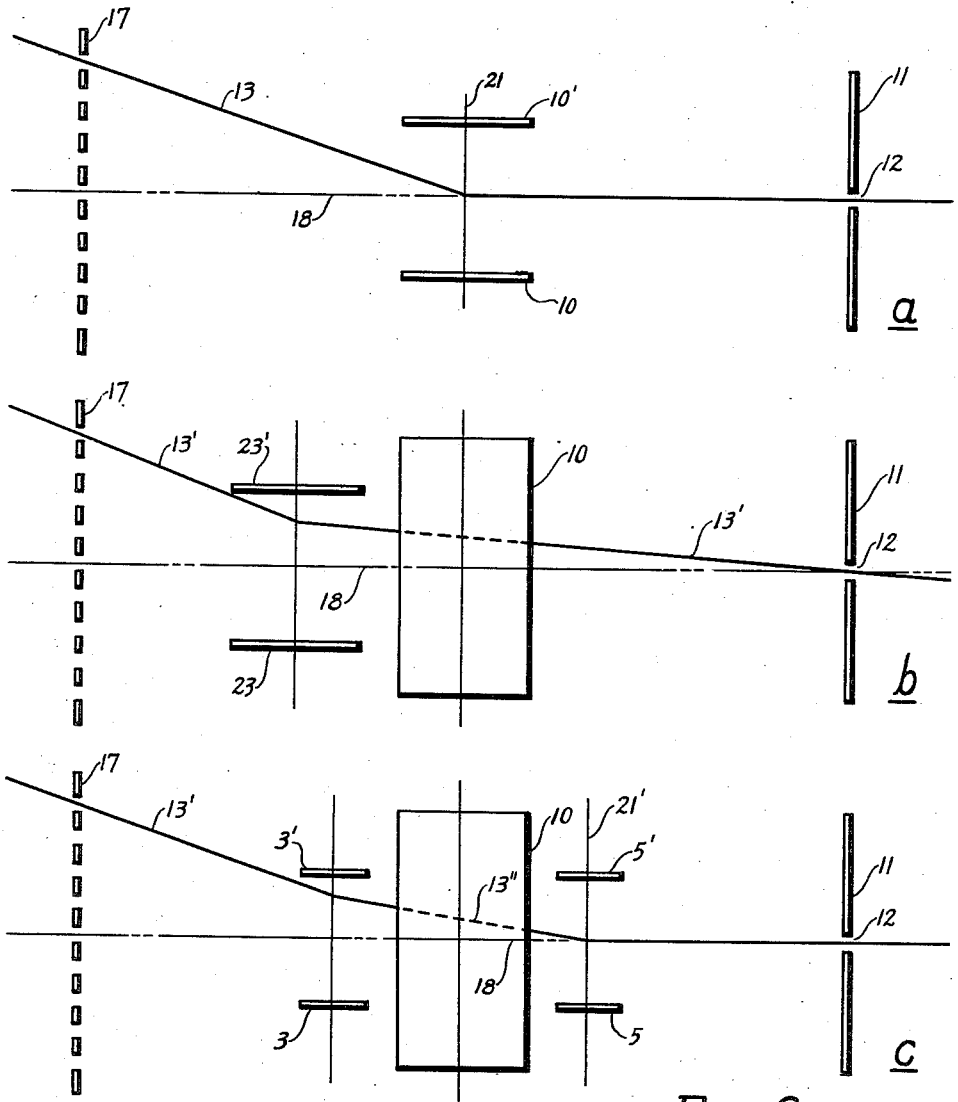
FIG_6
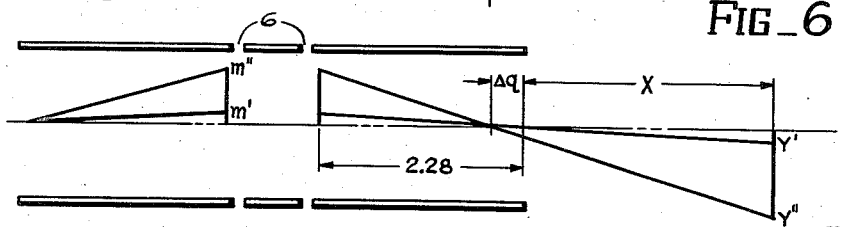
FIG_7
INVENTOR.
JOSEPH T. McNANEY.
BY
ATTORNEY.

Oct. 29, 1957   J. T. McNANEY   2,811,668
ELECTRON BEAM DEFLECTION CONTROL SYSTEM
Filed May 29, 1956   4 Sheets-Sheet 4
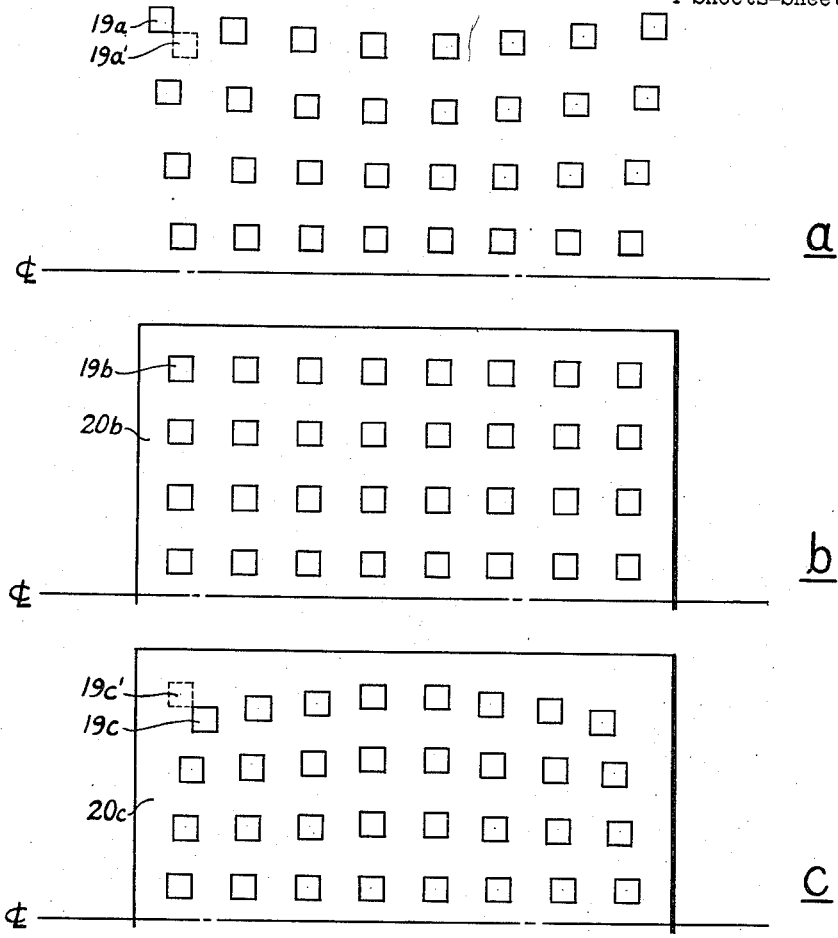
FIG_9
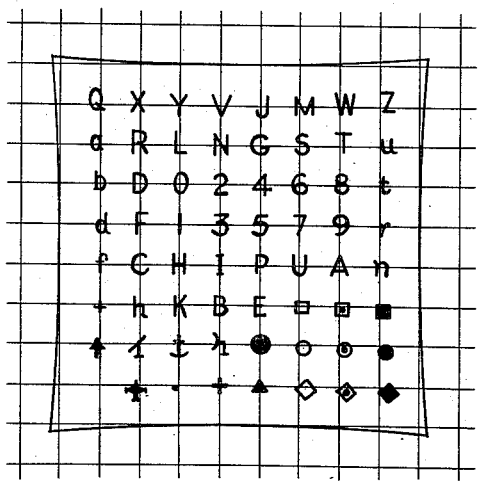
FIG_8
INVENTOR.
JOSEPH T. McNANEY.
BY
ATTORNEY.

United States Patent Office 2,811,668
Patented Oct. 29, 1957

2,811,668

ELECTRON BEAM DEFLECTION CONTROL SYSTEM

Joseph T. McNaney, La Mesa, Calif., assignor to General Dynamics Corporation, Rochester, N. Y., a corporation of Delaware Application May 29, 1956, Serial No. 588,067

10 Claims. (Cl. 315—17)

This invention relates generally to cathode ray tubes and more particularly relates to an electrostatic deflection system for deflecting electron beams in the cathode ray tube.

The deflection system utilizes cascade deflection of the beam which combines the desirable effects of coplanar-like beam deflection with beam angle deflection control.

In my copending application, Serial No. 414,551, now U. S. Patent No. 2,761,988, issued September 4, 1956, I disclose a cathode ray apparatus for selecting and displaying letters and numerals on a viewing screen for high speed recording purposes. The cathode ray apparatus disclosed in that application employs a thin solid member in the path of an electron beam in which a plurality of apertures are provided for changing the cross-sectional shape of the electron beam into a plurality of character configurations. Deflection plates are located between the solid member of character-shaped apertures and a second solid member containing an aperture. These deflection plates effect selection of individual beams, from the plurality of character shaped beams, through the selecting aperture. Additional deflection plates are provided for directing the selected beam toward any part of the viewing screen of the tube. I have found that in this application, as well as others, precise and exact alignment of the beams, selected through the selecting aperture, with the normal axis of the tube is desirable for the purpose of achieving satisfactory registration of the characters on the screen. Conventional cascade plate deflection structures do not provide the desired axial alignment of the beams as they pass through the selecting aperature.

Through the present invention, I have overcome these difficulties by providing a beam deflection system which references, with a high degree of accuracy, all of the individually selected beams to the normal axis of the tube, prior to their placement on the viewing screen.

In another copending application Serial No. 507,856 a cathode ray apparatus was disclosed which utilizes still another character shaped beam selection and deflection method of displaying letters and numerals on the viewing screen of a cathode ray tube. The cathode ray apparatus disclosed in this application employs a thin solid member, located along the path of the beam of electrons emanating from a gun source, having formed therein a plurality of character-shaped apertures. A first set of deflection plates is located between the electron gun and the solid member for directing the electron beam toward selected individual apertures in the solid member. When the electron beam passes through an aperture, it is shaped in the form of the cross section thereof and travels in a direction away from the normal axis of the tube. The shaped beams, however, are directed into the field of an electromagnetic lens which returns the beams toward the normal axis of the tube. A second set of deflection plates is located along the axis at a location where the beams cross the axis, which plates cause the individual beam to be deflected to become coaxial again with the normal axis of the tube. A third set of deflection plates is provided to direct the beams toward any desired part of the viewing screen. As is readily appreciable, very precise beam alignment is an important requirement in this second cathode ray apparatus also. For the purpose of obtaining proper registration of message characters on the display screen it is essential, prior to the placement of the character shaped beams on the screen, that these beams be returned very accurately to the normal axis of the tube. Because of optical distortions experienced in connection with the use of electro-magnetic lenses, and also electrostatic lenses, it has not been possible to achieve completely the degree of beam alignment required.

The present invention may additionally be employed in the second cathode ray apparatus to overcome the present difficulties.

In addition to the aforestated objects and advantages, it is an object of this invention to compensate for the spherical aberrations of the electron optical system of a cathode ray tube.

It is another object of this invention to provide an electrostatic deflection system which produces, in effect, coplanar-like deflection of an electron beam in both vertical and horizontal directions.

It is another object of this invention to provide a means of deflecting electron beams vertically and horizontally from a normal axial path at a common deflection plane so that when the deflected beams are returned to the axis by either a magnetic lens or an electrostatic lens, the beams will cross the axis at a common point along the axis and to provide a second deflecting means that will cooperate with the first means in returning the beams to the normal axial path.

It is another object of this invention to provide a beam deflection system which will provide for compensating of either pincushion or barrel distortion effects of an electron beam convergence lens.

It is another object of this invention to provide a deflection system that will respond in a non-linear manner to linearly graduated deflection control voltages.

Objects and advantages other than those set forth will be apparent from the following description when read in connection with the accompanying drawings, in which:

Figure 1 is a schematic diagram of a portion of a cathode ray tube embodying the invention and showing an electron optical system which makes use of a selecting aperture for the selection of a particular beam from a plurality of beams derived from a beam forming matrix, embodying the invention;

Figure 2 is a schematic diagram of another embodiment utilizing the invention in the selection of a particular beam from a plurality of character shaped beams emitted from the surface of a thermionic cathode and for target positioning;

Figure 3 is a schematic diagram of another embodiment of the invention;

Figures 4a, 4b, 4c show in detail a construction of the deflection plates of the systems shown in Figures 1, 2 or 3;

Figures 5a, 5b and 5c show in detail another construction of the deflection plates of the systems shown in Figures 1, 2 or 3;

Figures 6a, b and c, are diagrams showing the source and correction of non-axial beam alignments;

Figure 7 is a diagram showing the source of spherical aberrations;

Figure 8 shows the effects of spherical aberrations on registration;

Figures 9a, b and c are diagrams showing the relationship of character registration between the image and the object of character formats in the beam forming element.

Shown in Figure 1 is a cathode ray display tube utilizing an evacuated envelope or container 1 of the type described in my copending application Serial No. 414,551. Positioned in one end of the container is an electron beam generating means including a cathode 2 and a control grid 4. The electron beam 9 generated is projected generally along an electrical or electro-optical axis 39 of the tube toward a target 40, such as a well known phosphor screen or conductive plates or the like, positioned at the other end of the envelope. Impingement of the cross-section of th beam 9 on the target will cause the target or screen 40 to be excited and change electron bombardment into a corresponding light image. The target 40 may be of a construction common to each of the tubes as shown in Figures 1, 2 or 3.

A convergence means, which may be electromagnetic or electrostatic, is shown as an electrostatic lens 6. This lens 6 is positioned along the tube for focusing the beam cross-section to a predetermined location, which location will determine the plane of influence at which the beam 9 will be deflected. A beam forming means or matrix 7, having therein a plurality of character shaped openings, is positioned in front of the lens and will impart at least one cross-sectional shape to the beam 9. In the simplest embodiment it may be desirable to have the matrix positioned intermediate the beam generating means and the target.

Immediately in front of the matrix 7 is positioned a beam deflection system 8. Deflection system 8 is typical of the preferred embodiment of the invention. The system 8 in its simplest form may be disposed intermediate the beam generating means and the target of the tube 10. A deflection system, in accordance with deflection system 8, may be employed to deflect the electron beam 9 in various applications: such as, in Figure 1, system 8 will deflect the beam 9 to position a portion of the beam through aperture 12 in aperture plate 11; system 16 positions or directs different shaped cross-sections of the beam to desired positions on the target; in Figure 2, system 28 performs a like function as system 8; in Figure 3, system 28 performs a function similar to system 8 (Figures 1 and 2) wherein the electron beam is positioned to illuminate at least a desired part of matrix 20; systems 29, 30 of like construction with system 8 performing, respectively, a referencing function and a target positioning function upon the beam. The referencing function is disclosed more fully in the copending application of Omer F. Hamann, Serial No. 507,902, assigned to the common assignee hereof.

Reverting to the operation of Figure 1, the action of the lens 6 causes a beam of electrons 9, emanating from the cathode 2, to cross-over at a predetermined location 41 along the electrical axis 39 which is substantially midway of the deflection system 8. The beam 9 then follows divergent paths until the beam reaches the surface of aperture plate 11. Aperture plate 11 has formed therethrough selecting aperture 12. The selecting aperture 12 may be positioned substantially coaxially with and symmetrically disposed about the electrical axis 39 of the tube. Only one of the character shaped beams 15 selected from a plurality of various shaped beams is directed through the aperture 12 at any single instant of time. The shaped beam 15 is therefore projected from the aperture 12 substantially along the electrical axis. After the desired beam has been selected, the beam may be directed to any part of the viewing screen or target of the tube by deflection system 16. Deflection system 16 utilizes preferably the same construction as deflection system 8 as aforestated.

Details of the deflection systems 8, 16, 28, 29 and 30, all of which may be identical, are shown in Figure 4. Deflection system 28 of Figure 3 is also referred to as the first deflection system. Deflection systems 8 of Figures 1 and 2 are also known generally as second deflection systems. Deflection systems 16 of Figures 1 and 2 and system 30 of Figure 3 are generally known as third deflection systems. Deflection system 29 shown in Figure 3 is known as fourth deflection system. In Figure 4, one pair of plates 10, may be used to deflect electrons, for example, in a horizontal direction, and two pair of plates 3, 3' and 5, 5', in combination, to deflect electrons in a vertical direction. The deflection sensitivity of the dual or split pair of plates 3, 3' and 5, 5' is essentially equivalent to that of the single pair of plates. That is, plates 10, 10' will establish an electrostatic field having a predetermined field density, and each pair of plates 3, 3' or 5, 5' will establish a field substantially one half of the predetermined field density. Therefore, part of the beam deflection, vertical in this example, is accomplished prior to passage of the beam through the horizontal plates 10, and a further deflection of the beam is made after passage of the beam through the horizontal plates.

Some of the newly found advantages and results to be gained through the use of such a system 8 or 16 in the selection of a particular character shaped beam through the aperture 12 and for a better understanding of the operation thereof, examine with reference to Figures 6a, b and c. One of the objectives of this invention is, by means of a system of deflection plates 8 or 16, to return an electron beam to a normal axis of an electron optical system such as, referencing accomplished by plates 29, whether the electron beam is approaching the axis from a vertical direction, or from a horizontal direction. This basic operation is common to most applications of the system. In Figures 6a, b and c, the path of an electron beam 13 is shown leaving the plane of the matrix 17 in the direction of the electro-optical or electrical axis 18 which is co-axial with the aperture 12 of the aperture plate 11. A common deflection plane 21, perpendicular to the optical axis 18, may, for purposes of explanation, be positioned approximately midway between the matrix 17 and the aperture plate 11.

In Figure 6a, a pair of deflection plates 10, 10' is located, electrically, at the central deflection plane 21, and the path of the beam intersects the axis 18 at the latter plane 21. When the proper potentials are applied to the deflection plates 10, 10' the beam can be made to follow the axis through the aperture 12. At 6b, a second set of deflection plates 23, 23' is shown positioned in a conventional manner with respect to the first set 10, and viewed as though they have been rotated 90° about the axis with respect to the first set. A beam is directed along a path 13' toward the axis 18 to a point at which the latter is intersected by the mid-deflection plane 21. When potentials are applied to the second set of plates 10, 10' for the purpose of directing the beam through the aperture 12, th beam 13' will cross the axis 18 at the plane of the aperture plate 11.

Since it is desirable to have the beam 13' pass through the aperture and remain on axis, the invention provides the separation of the deflection surfaces of the respective plates 23 and 23', shown at (b), into substantially equal halves 3, 3' and 5, 5', as shown at (c) having a capability of generating a field density of one-half that of plates 10, 10'. Plates 3, 3' and 5, 5' are positioned on opposite sides of the horizontal plates 10, 10' orthogonally disposed about the axis with respect to plates 10, 10' and substantially spaced along the axis equidistant from the deflection plane 21. When the potentials are applied to the dual pair of plates the first pair 3, 3' will deflect the beam along a path 13" which intersects the axis 18 at the deflection plane 21' of the second pair of plates 5, 5' but the latter plates will return the beam on the axis and through the aperture 12. Plates 3, 3' and 5, 5' may together furnish electrostatic field density of the same amount as is furnished by plates 10, 10'. In addition, it is possible to physically cut in half widthwise one of the plates 10 thereby furnishing a plate 3 which has ½ the width of plate 10, but the same length. This eases manufacture considerably. Such an approach is not however, the only approach in establishing with each pair of plates 3, 3' and 5, 5' a one-half field density of that generated by plates 10, 10'.

With the deflection system 8 it is possible to have all selected beams pass through the electrical center of the final deflection system 16. System 16 will deflect the beam from the axis to the desired position on the screen. It will therefore be possible to achieve good registration of character images on the screen 40, independently of where the characters happen to appear in the matrix 7.

As shown in Figure 4(a), plates 3, 5 and 3', 5' may be structurally joined together and positioned in encompassing relation to plates 10, 10'. The final deflection plate system 16 of Figure 1 is similar to the aperture selection plate system 8, and the advantages to be gained through each system are similar. In each case, the effects of deflecting beams in either vertical or horizontal directions will be as though the bending of the beams is taking place at a common deflection plane. Improvements in registration will thereby result from the establishment of somewhat more rectangular patterns on the viewing screen.

In Figure 2 another embodiment of the invention, utilizing the improved deflection plate systems, makes use of a cathode emitter 22 of character shaped beams. An emitter of this type is similar to that described in my copending application Serial No. 537,112. Still another embodiment of this invention is shown in Figure 3, which makes use of the improved deflection systems in a character beam forming gun similar to that described in the copending application Serial No. 507,856. The deflection plate systems 28 for the selection of character shaped beams in these latter embodiments of the invention may be of the type to be described in connection with Figure 5. The plate systems shown in Figure 5 contain additional improvements over those described and shown in Figure 4, which are hereinafter described. The plates 3a, 3b, and 5a, 5b may be structurally joined together as are the plates of Figure 4, but the cross-section of the plates of Figure 5 is a substantially parabolic curvature. The curvatures are symmetrically disposed about the axis in orthogonal and spaced relation to each other.

Reference is now made to Figure 7, which diagram shows, by way of example, the source of spherical aberrations normally experienced in the use of electron lens systems of either the electrostatic or magnetic types. The effects of spherical aberrations on the registration, or alignment of message characters on the viewing screen of the tube, is exemplified in Figure 8.

Pincushion distortion in the projected matrix pattern of Figure 8 is evidence of spherical aberration. If the matrix heights are $m'$ for a paraxial ray, and $m''$ for a marginal ray, there will be a difference, $\Delta q = \Delta z$ in the focal positions of the two rays. If the focal points were co-incident the magnification ratio of the projected-image height $y'$ to the matrix height $m'$ would be constant, or $y'/m'$ $y''/m''$. However, since the focal points are not co-incident, the latter ratio will be greater. From simple geometrical considerations, the ratio of marginal to paraxial magnification is given by: $(1+\Delta q/x)(1-\Delta q/2.28)$, for the drawing shown in Figure 7. The resultant matrix shape was obtained with a projection distance of $x=28$ inches.

The present invention aids in minimizing the distortion normal in apparatus such as shown in Figure 1. The minimization of the distortions may, in addition, be aided by the proper orientation of character shaped openings in the matrix. Since a square pattern of character shaped openings in a matrix 7 are transformed into a pincushioned array of images after they have passed through a convergence lens 6, this pincushioning can be overcome by proper location of the openings in the matrix, or on the surface of the cathode 22, which will be somewhat in the form of a barrel. After a barrelled array of electron images have passed through the lens, the effects of lens abberrations will convert the array to a square pattern. The latter is desirable since, under these conditions, the application of linerally stepped signals to the selection plate system 8 will produce the desired selection of character shaped beams through the aperture 12.

If a similar approach is attempted in the case of Figure 3, to correct for these spherical aberrations, the character selection plate system of Figure 4 would then have to be operated from a non-linear selection voltage source. This, of course, is undesirable from the standpoint of the complications that would be added to the circuitry in order to provide the required character selection signal non-linearities. However, through the use of the novel deflection plate system shown in Figure 5, it will also be possible to minimize the effects of spherical aberrations in the convergence lens by proper orientation of character shaped openings in the matrix. This improved plate system may be designed so as to function in a manner that will produce the required degree of deflection non-linearity in response to linear control signal inputs.

The degree of pincushioning or misalignment of the characters in a display of the matrix format on the screen of the tube is directly related to the degree of misregistration of characters appearing in a displayed message. With further reference to Figure 8, characters having the greatest amount of misregistration will be those in the corners of the matrix, such as, "Q," "Z," and "<>." The other characters showing a lesser degree of misregistration would be those assuming the positions of the characters "a," "x," "w," etc.

The layout of squares, "□," in Figure 9 explains further the effect of lens aberrations on character misregistration. Each square corresponds to the position of a character in the display of a normally rectangular format of characters in a matrix as shown, for example, in Figure 9b. In each of the layouts referred to in Figure 9, only the upper ½ of a complete layout of characters is shown, and in each case, above center lines C.

The deflection system of Figure 5 will make it possible to arrange the characters in the matrix so that curved lines and columns of characters shown in Figure 9a, will take the form of a square raster instead of one having the outline of a pincushion. The first requirement of this embodiment will be to engrave the openings in the matrix in a barrel-shaped arrangement, as indicated in Figure 9c, in order that an image of the matrix format will appear in the form of a square, as shown in Figure 9b, after having passed through the convergence field to the coil.

The deflection systems shown in Figures 4 and 5 are similar in that they both produce the effect of co-planar deflection. The importance difference between the two systems, however, may be noted in Figure 4c, and Figure 5c, respectively. The views shown are looking at the ends of the plates, in the direction of the electron gun source. The cross-section of the plates at Figure 5c are shown to have the parabolic cross-section presenting a deflection curvature while that of Figure 4c shows a rectangular cross-section. In operation, if the beam 26 is deflected upward by plates 5a—5b, the degree of movement toward plate 5b will be a function of beam velocity, distance between plates, and potential difference applied to the plates. If a potential is also applied to plates 10a—10b and, for example, deflected in the directions of plate 10b, the beam deflection in the vertical direction of plate 5b will decrease. This decreased vertical position of the beam 26 will be in relation to the increased spacing between the deflecting surfaces of plates 5a and 5b, with respect to beam position, as the beam is deflected horizontally away from the normal axis of the system.

Since a barrel shaped array of characters, similar to that shown in Figure 9c, can be made inversely proportional to a pincushion image of a normally rectangular matrix format of beams after having passed through a convergence lens, the plates 5a—5b, and 10a—10b, may be shaped so that linearly applied signals to said plates may cause an electron beam to respond in a particular barrel shaped manner of beam deflection. To explain further, with reference to Figures 9a, b and c, a character 19b in the corner of the matrix 20b may assume a position 19a on the screen, with respect to a properly aligned position 19a', because of the effects of lens aberrations. If, on the other hand, the character 19c in the matrix 20c was displaced with respect to a more linear position 19c', the effects of lens aberrations would allow the character 19c to assume a position 19a' on the screen of the tube.

Figure 3 shows the respective locations of all of the essential elements, discussed thus far. The electron gun 25 at one end of display tube projects the beam of electrons along the axis of the tube and into the character selection plate system 28. The beam 26 is then directed through selected openings in the matrix 20 and then into the magnetic field of a convergence lens 6 which, in turn, redirects the electron beam toward the normal axis of the gun at the deflection plane of the reference plates 29. After the electron beam is returned to the axis of the tube it enters the field of deflection plates 30 which positions the beam on the viewing screen of the tube.

The selection plates 28 may be of a construction shown by plate system of Figure 5, and the reference plates 29 may be of the type shown by the plate system of Figure 4. The selection plates 3a—3b and 5a—5b, in combination with 10a—10b will convert linearly applied control voltages to non-linear deflections of the electron beam 26. As explained in connection with Figure 9c, the character openings can be arranged in the matrix to compensate for the lens aberrations, and the non-linearity of the arrangement of characters can be compensated for by proper design of the selection plate system 28 with regard to the geometry of the deflecting surfaces.

The particular embodiments of the invention illustrated and described herein are illustrative only and the invention includes such other modifications and equivalents as may readily appear to those skilled in the art, within the scope of the appended claims.

I claim:

1. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, the system being disposed substantially symmetrically about the electrical axis and intermediate the beam generating means and the target, the deflection system comprising a first set of deflection plates, and two substantially identical second sets of deflection plates disposed in substantially orthogonal spaced relation to the first set, one second set being disposed on either side of the first set, the second sets being structurally joined together.

2. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, the system being disposed substantially symmetrically about the electrical axis and intermediate the beam generating means and the target, the deflection system comprising a first set of deflection plates, and two substantially identical second sets of deflection plates disposed in substantially orthogonal spaced relation to the first set, one second set being disposed on either side of the first set, the second sets being structurally joined together and positioned about the first set in symmetrically spaced apart relation thereto.

3. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, the system being disposed substantially symmetrically about the electrical axis and intermediate the beam generating means and the target, the deflection system comprising a first set of deflection plates, and two substantially identical second sets of deflection plates disposed in substantially orthogonal spaced relation to the first set, one second set being disposed on either side of the first set, the second sets being structurally joined together, each of the plates having a substantially rectangular cross-section.

4. A cathode ray display tube comprising an evacuated envelope, a beam generating means placed adajacent one end of the envelope for generating and projecting an electron beam substantially along an electrical axis, a target positioned at the other end of the envelope and responding to impingement of the beam thereon, a deflection system for deflecting the beam, the system being disposed substantially symmetrically about the electrical axis and intermediate the beam generating means and the target, the deflection system comprising a first set of deflection plates, and two substantially identical second sets of deflection plates disposed in substantially orthogonal spaced relation to the first set, one second set being disposed on either side of the first set, the second sets being structurally joined together, each of the plates having a substantially parabolic cross-section curvature, the plates being arranged symmetrically about the axis and having their curvatures positioned in orthogonal spaced relation to each other.

5. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, said system being capable of effecting deflection of the beam in two predetermined stages directing the beam toward and along the axis, the system being disposed intermediate the beam generating means and the target, the deflection system comprising a first set of deflection plates, and two substantially identical second sets of deflection plates disposed in substantially orthogonal spaced relation to the first set, one second set being disposed on either side of the first set.

6. A cathode ray display tube comprising an evacuated envelope, a beam generating means placed adjacent one end of the envelope for generating and projecting an electron beam, a target positioned at the other end of the envelope and responding to impingement of the beam thereon, beam forming means presenting apertures for imparting at least one cross sectional shape to the beam, said apertures being aligned in a barrel shaped array, the beam forming means being positioned intermediate the generating means and the target, convergence means positioned intermediate the generating means and the forming means for focusing the beam to a predetermined location, a second and a third deflection system for deflecting the beam, each of the deflection systems comprising a first set of deflection plates, and two substantially identical second sets of deflection plates disposed in substantially orthogonal spaced relation to the first set, one second set being disposed on either side of the first set, the second deflection system being positioned at substantially the location, an apertured plate having an aperture is positioned intermediate the location and the target, the third deflecting system being positioned intermediate the apertured plate and the target, the second deflection system being adapted to cause selective deflection of the beam to direct portions thereof through the aperture toward the third deflecting means, the third deflection system positioning that portion of the beam at a desired location on the target, said deflection systems being adapted to cause successive presentation of said cross sectional shape upon the target in a rectangular array.

7. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, the system being disposed substantially symmetrically about the electrical axis and intermediate the beam generating means and the target, the deflection system comprising a first set of deflection plates, and two substantially identical second sets of deflection plates disposed in substantially orthogonal spaced relation to the first set, one second set being disposed on either side of the first set, each of said second sets being structurally joined together, a linearly graduated voltage source for application to the deflection system, said system responding to the linear voltage with a non-linear response.

8. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, the system being disposed intermediate the beam generating means and the target, the deflection system comprising a first set of deflection plates having a predetermined surface area, and two substantially identical second sets of deflection plates disposed in substantially orthogonal spaced relation to the first set, one second set being disposed on either side of the first set, the plates of the second sets having a surface area of one-half the predetermined surface area, the second sets being equally spaced from the first set and the first set and second set being equally spaced from and symmetrically disposed about the axis.

9. A cathode ray display tube comprising an evacuated envelope, a beam generating means placed adjacent one end of the envelope for generating and projecting an electron beam substantially along an electrical axis, a target positioned at the other end of the envelope and responding to impingement of the beam thereon, a deflection system for deflecting the beam, the system being disposed intermediate the beam generating means and the target, the deflection system comprising a first set of deflection plates, and two substantially identical second sets of deflection plates disposed in substantially orthogonal spaced relation to the first set, one second set being disposed on either side of the first set, each of said second sets being structurally joined together, the first and second sets interacting with the beam and being adapted to effect upon the beam cross section a correction of pincushion and barrel distortion in the tube.

10. A cathode ray display tube comprising an evacuated envelope, a beam generating means placed adjacent one end of the envelope for generating and projecting an electron beam substantially along an electrical axis, a target positioned at the other end of the container and responding to impingement of the beam thereon, a deflection system for deflecting the beam, the system being disposed substantially symmetrically about the electrical axis and intermediate the beam generating means and the target, the deflection system comprising a first set of deflection plates, and two substantially identical second sets of deflection plates disposed in substantially orthogonal spaced relation to the first set, one second set being disposed on either side of the first set, the second sets being structurally joined together, a linearly graduated voltage, the deflection system being responsive to the voltage to effect coplanar-like selectively horizontal and vertical deflections of the beam with substantially complete beam angle deflection response.

References Cited in the file of this patent

UNITED STATES PATENTS

| | | |
|---|---|---|
| 2,302,786 | McGee | Nov. 24, 1942 |
| 2,574,975 | Kallmann | Nov. 13, 1951 |
| 2,617,078 | Van Overbeek | Nov. 4, 1952 |
| 2,623,167 | Diemer | Dec. 23, 1952 |
| 2,711,493 | Lawrence | June 21, 1955 |
| 2,728,872 | Smith | Dec. 27, 1955 |
| 2,728,873 | McNaney | Dec. 27, 1955 |